United States Patent [19]

Denis et al.

[11] Patent Number: 5,649,684
[45] Date of Patent: Jul. 22, 1997

[54] MOVABLE SEAT FOR A VEHICLE

[75] Inventors: Bernard Denis, Montlhery; Christophe Thouverey, Bievres, both of France

[73] Assignee: Bertrand Faure Equipements S.A., Boulogne Cedex, France

[21] Appl. No.: 568,498

[22] Filed: Dec. 7, 1995

[30] Foreign Application Priority Data

Dec. 9, 1994 [FR] France .................. 94 15152

[51] Int. Cl.$^6$ ...................................... B60N 2/02
[52] U.S. Cl. ..................... 248/503.1; 248/221.11; 248/222.11; 296/65.1; 403/327
[58] Field of Search ............ 248/503.1, 221.11, 248/222.11, 685, 681, 501, 503, 423; 296/63, 65.1; 297/463.1; 403/326, 327

[56] References Cited

U.S. PATENT DOCUMENTS

| 117,874 | 8/1871 | Fellows ................... 248/503.1 |
| 4,052,102 | 10/1977 | Rosenthal .................. 248/398 X |
| 4,277,043 | 7/1981 | Weik . | |
| 4,759,580 | 7/1988 | Berklich, Jr. et al. ............ 248/503.1 X |
| 4,836,597 | 6/1989 | Izumida ..................... 296/63 |
| 4,865,377 | 9/1989 | Musser et al. ................. 248/503.1 X |
| 4,946,216 | 8/1990 | Demick ..................... 248/503.1 X |
| 4,955,575 | 9/1990 | Moore ...................... 248/503.1 X |
| 4,971,379 | 11/1990 | Rumpel et al. ................. 248/503.1 X |
| 5,152,571 | 10/1992 | Kohler ..................... 248/503.1 X |
| 5,326,067 | 7/1994 | Gonzalez . | |
| 5,348,264 | 9/1994 | Few et al. .................... 248/503.1 |

FOREIGN PATENT DOCUMENTS

| 0 171 660 | 2/1986 | European Pat. Off. . |
| 0 537 078 | 4/1993 | European Pat. Off. . |
| 0 546 908 | 6/1993 | European Pat. Off. . |
| 2 500 383 | 8/1982 | France . |
| 42 16 967 | 9/1993 | Germany . |
| WO92/02384 | 2/1992 | WIPO . |

*Primary Examiner*—Leslie A. Braun
*Assistant Examiner*—Derek J. Berger
*Attorney, Agent, or Firm*—Pollock, Vande Sande & Priddy

[57] ABSTRACT

A movable seat for a vehicle, of the type which can be easily joined to or separated from the floor of the vehicle, including at least one unlockable fixing mechanism which can be brought, along a given direction of insertion, to cooperate with retaining means of the floor so as to rigidly join the seat to the floor, characterized in that the fixing mechanism comprises a locking member transversally sliding with respect to the direction of insertion.

5 Claims, 2 Drawing Sheets

MOVABLE SEAT FOR A VEHICLE

FIELD OF THE INVENTION

The present invention relates to a vehicle seat and, more particularly, to such a seat that is movable and removable.

BACKGROUND OF THE INVENTION

The object of the present invention is a movable seat for a vehicle, which can be rigidly joined to the floor of the vehicle, or be separate from it, either totally so as to make the seat movable, or partially so as to make it possible, for example, to pivot it forward by tilting it.

Tiltable seats are mainly used as front seats in two-body or three-body automobile vehicles to make it possible to gain access to the back seats more easily, but they can also be used as second row seats in single-body type vehicles.

Movable seats are normally used as back seats in single-body type vehicles, typically as third row seats, but also as second row seats when the tilting function is not required.

For safety reasons, it must be possible to rigidly join these seats, under normal use, to the floor of the vehicle. Furthermore, it must be possible to easily remove or tilt them without requiring tools.

As a result, these seats typically include a manually unlockable fixing mechanism. Seats including such mechanisms are known of in which the feet of the seat's frame end with a fork-shaped piece which overlaps a fastening rod fixed to the floor, said rod connecting the two opposite edges of an opening with a U-shaped cross-section cut in the floor. The locking member making it possible to secure this foot against the floor, or to separate it, then consists of a sort of hook mounted on said fork-shaped piece in a pivoting manner, with its end free to penetrate said opening so as to be locked beneath said rod, this hook being maneuvered by appropriate means.

Other fixing means are known of in which the pivoting hook, instead of latching onto a separate rod, as indicated above, latches directly beneath a reinforced edge of the opening provided in the floor.

One disadvantage of these mechanisms is that, due to its hook-like shape, the piece which ensures the locking essentially works by bending in the curved part of said hook and tends to open when it is subject to stresses tending to separate the seat from the floor. The opening of the hook creates a certain play in the link and can lead to the unlocking of the seat.

BRIEF DESCRIPTION OF THE INVENTION

The purpose of the present invention is to eliminate these disadvantages, and it is particularly intended to ensure a greater resistance to the breaking loose of the seat, especially in the case of an accident.

With these goals in view, the object of the invention is a movable seat for a vehicle, of the type which can be easily joined to or separated from the floor of said vehicle, including at least one unlockable fixing mechanism which can be brought, along a given direction of insertion, to cooperate with retaining means of said floor so as to rigidly join the seat to the floor, characterized in that said fixing mechanism comprises a locking member transversally sliding with respect to said direction of insertion.

Such a locking mechanism has the advantage that the locking member then works essentially by shearing, which makes it more resistant.

According to a particular arrangement, the locking member slides obliquely with respect to the direction of insertion.

As will be better understood further on, this arrangement makes it possible to enable the locking and to ensure it despite the gaps possibly existing between the position of the retaining means of the floor of the vehicle and the fixing mechanism.

Further features and advantages will be understood upon reading the description which follows of a foot of a seat according to the invention.

We will refer to the attached drawings, in which:

DETAILED DESCRIPTION OF THE INVENTION

The description which follows concerns the fixing mechanism of a rear foot of a seat according to the invention. It will easily be understood that the same mechanism will normally be placed on the second rear foot, and that it can also equip the front feet in the case of a movable seat.

Figure 1:
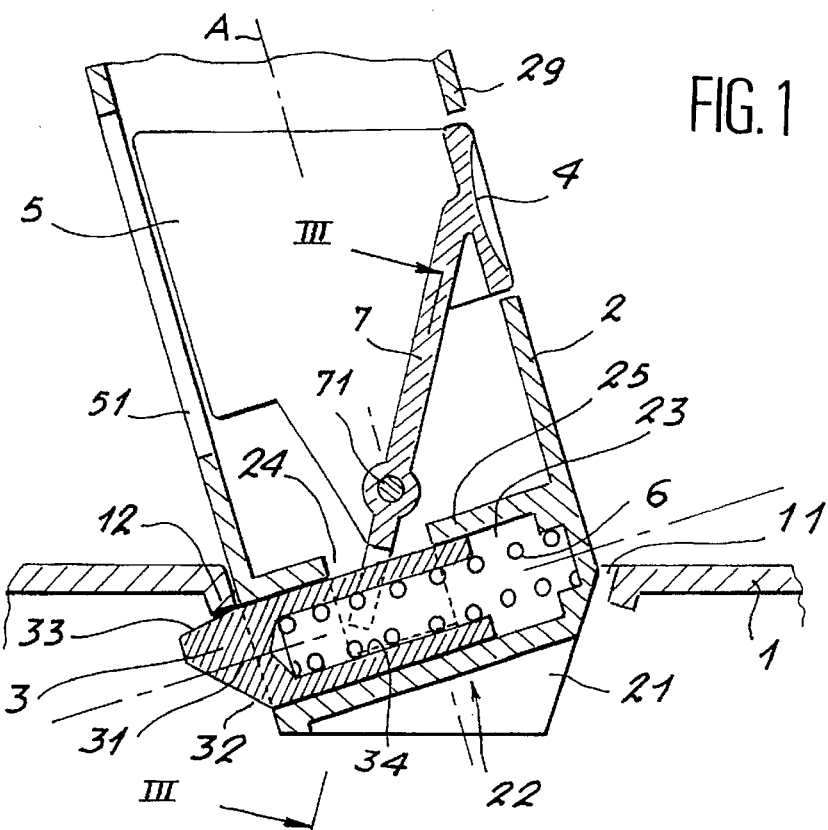
FIG. 1 is a cross-sectional view of a foot of a seat equipped with a fixing mechanism according to the invention, locked onto the floor of a vehicle.
Figure 2:
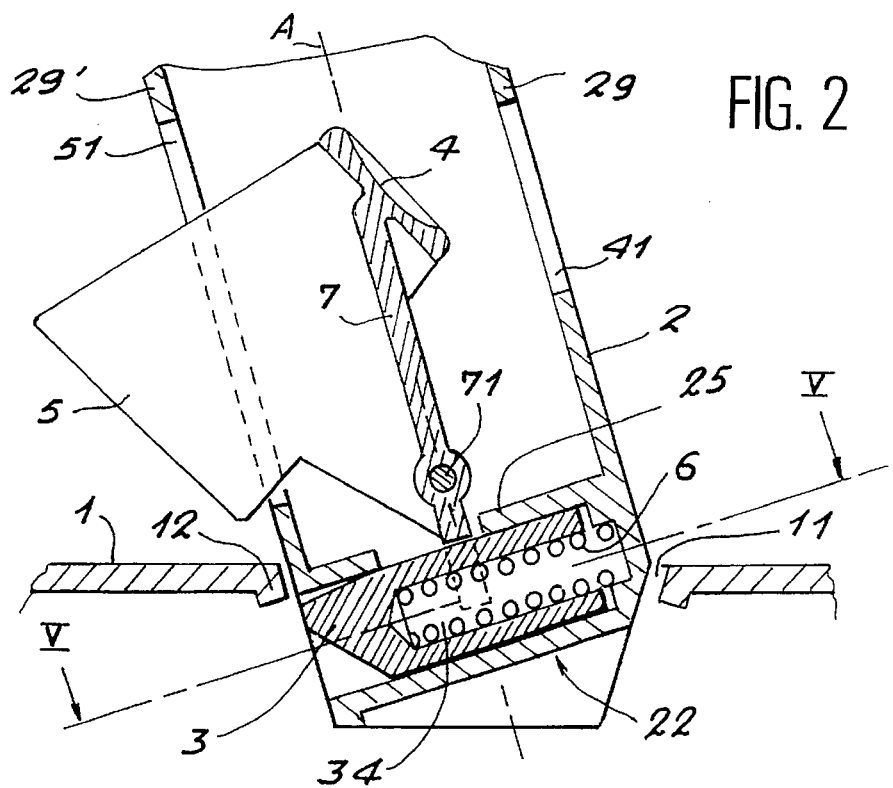
FIG. 2 is a corresponding view in unlocked position.

FIGS. 1 and 2 show, in a simplified manner, the floor 1 of the vehicle, in which is cut an opening 11 whose edges 12 are folded downwards so as to improve the rigidity and the resistance of the floor in the area where the seat is fixed.

The general direction (axis A) of the foot 2 of the seat is oblique, but it could also be perpendicular to the floor 1.

The lower end 21 of the foot 2 is bevel-shaped so as to ease its penetration into the opening 11 in the floor. The vertical position of the foot 2 is defined by lateral abutments 8 of the foot, visible in FIG. 3, which rest against the floor 1 when the foot is inserted into the opening 11. It must be noted that a certain play is provided between the foot 2 and the edges of the opening 11, particularly in the longitudinal direction of the seat (i.e. the horizontal direction in the cross-section plane of FIGS. 1 and 2), so as to ensure a correct insertion of the ends of the feet into the openings 11, despite possible differences between, on the one hand, the spacing between the seat's feet and, on the other hand, the spacing between said openings.

The foot 2 includes in its lower part a locking mechanism 22 mainly consisting of a locking member 3 shaped, at its end 31 intended to cooperate with the edge 12 of the opening 11, like the bolt of a conventional lock, i.e. including an end chamfer 32. The bolt 3, of rectangular cross-section, is mounted so as to slide inside a bore 23 of corresponding cross-section which serves as a guide for said bolt and is provided, by molding for example, in the lower part of the foot 2. The axial direction of the bore 23 is slightly oblique with respect to the horizontal plane, defined by the surface of the floor 1, so that the bolt 3 slides obliquely with respect to the direction of the insertion of the foot into the opening, this direction being typically substantially perpendicular to the floor.

Furthermore, the bolt includes at its end 31 on the side opposite the chamfer 32, a bevelled upper surface 33 inclined with respect to the direction of sliding, this surface cooperating, in the locked position, with the edge 12 of the opening 11, by abutting against said edge, which makes up the retaining member of the floor.

The mechanism 22 includes elastic return means to bring the bolt 3 back to said locked position, consisting, for example, of a compression spring 6 placed in an axial recess 34 in the bolt and resting against the bottom of the bore 23.

The mechanism also includes control means, consisting of a lever 7, to shift the bolt 3, in opposition to the pushing strain created by the spring 6, towards its unlocked position, i.e. fully inserted into the bore 23. The lever 7 is located inside the recessed interior of the foot 2 of the seat and is hinged on it, as it is mounted in a pivoting manner on a pin 71 inserted into the bores 72 of said foot.

Figure 3:
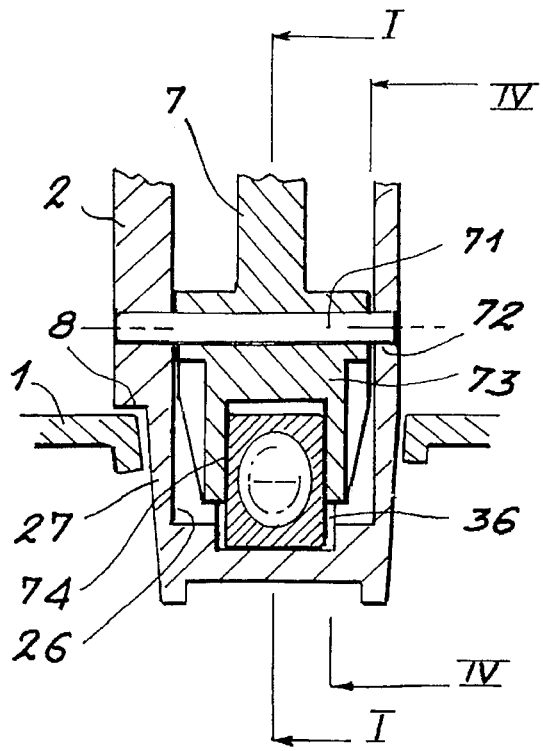
FIG. 3 is a cross-sectional view of the lower part of the foot, taken along line III—III of FIG. 1.
Figure 4:
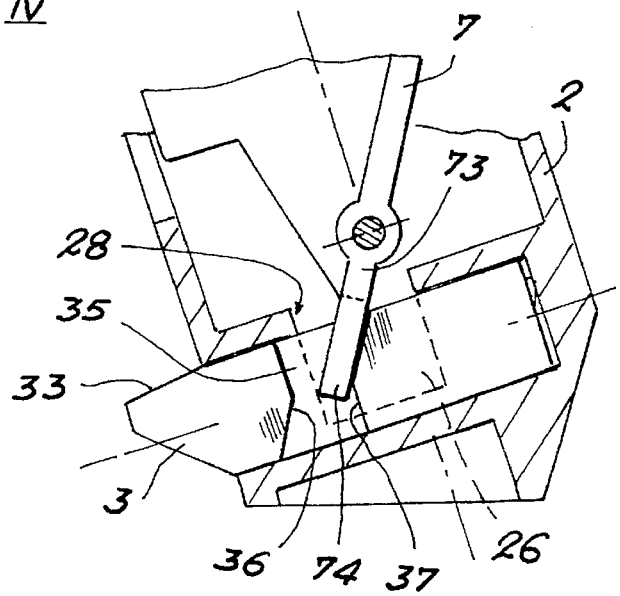
FIG. 4 is a cross-sectional view taken along line IV—IV of FIG. 3.
Figure 5:
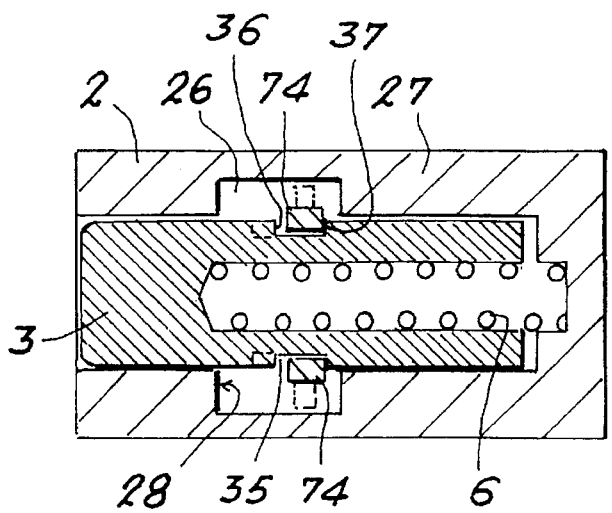
FIG. 5 is a cross-sectional view taken along line V—V of FIG. 2.

The lower end of the lever 7, shaped like a fork 73, cooperates with driving means of the bolt 3, consisting of the flanks 36, 37 of two transversal grooves 35 provided on the side faces of the bolt. The two branches 74 of the fork 73 fit into both sides of the bolt, inside the grooves 35, as can be seen in FIGS. 3 to 5. As can be seen in FIG. 4, the grooves 35 are shaped like double trapezoids, attached by their smaller bases, so as to allow for the angular clearance of the branches 74 between the front and rear flanks 36 and 37 of said grooves when the lever rotates about the pin 71.

An opening 24 is cut in the upper wall 25 of the bore 23 to allow for the passage of the fork 73, and undercuts 26 are similarly provided in the side walls 27 of the bore 23 to allow for the passage and the free movement of the branches 74 of the fork 73.

It must be further noted, as can be seen in FIGS. 1 and 4, that, in the locked position, the ends of the branches 74 which project laterally from the sides of the bolt 3 abut against the edge 28 of the undercuts 26, thus preventing the bolt 3 from exiting the bore 23 under the effect of the spring 6.

This embodiment of the mechanism is particularly simple, but it could be replaced by any other arrangement making it possible to ensure that the fork or the lever cooperates with any abutment surface whatsoever of the mechanism, so as to limit the displacement of the bolt in the direction in which it exits the bore 23.

The end of the lever 7 opposite the fork 73 is equipped with a pusher 4, made so as to be flush with the wall 29 of the foot 2 within a window 41 cut for this purpose in said wall 29.

Furthermore, the mechanism includes a visual indicator, apparent when the bolt 3 is not in locked position. Preferably, as can be seen in FIGS. 1 and 2, this visual indicator consists of a plate 5, or flag, integral with the lever 7 and located, with respect to the latter, on the other side of the pusher 4. In locked position, this flag 5 is fully concealed within the foot 2 (see FIG. 1), whereas in unlocked position, the plate 5 emerges from the foot through a second window 51 cut in the wall 29' of the foot opposite the wall 29.

It must be noted that, according to the arrangement previously described as to the link between the fork 73 and the bolt 3, it is the bolt which ensures, by means of the rear flanks 37 of the grooves 35 resting against the branches 74 of the fork, the return of the lever 7 to its rest position, corresponding to the locked position. Thus, the flag makes up a reliable visual indicator in the event of insufficient locking, since as long as the bolt is not in its locked position, i.e. of maximum projection, the flag is at least partially visible, and it is only fully concealed within the foot when the locking is perfectly ensured.

When the seat is installed, by inserting the foot 2 in the opening 11 in the floor, the chamfer 32 of the bolt comes into contact with the edge 12 of the opening, which results in pushing the bolt into its bore by compressing the spring 6. When this happens, the bolt makes the lever 7 pivot by means of the front flanks 36 of the grooves 35 resting against the branches 74 of the fork 73, thus making the flag 5 visible through the window 51. As soon as the foot is sufficiently driven into the opening 11, the bolt 3 is automatically returned to the locked position by the spring 6, by passing beneath the edge 12 of the floor, the latching of the bolt beneath this edge being facilitated by the inclination of its upper surface 33 with respect to the sliding direction.

To unlock, pressing the pusher 4 makes the lever 7 pivot, bringing about the displacement of the bolt 3, by means of the branches 74 of the fork resting against the rear flanks of the grooves 35, until it penetrates the bore 23 sufficiently to allow the foot 2 to exit the opening 11.

The invention is not limited to the arrangements described above merely as an example. In particular:

the abutment of the foot against the floor can be provided by means other than the lateral abutments 8, for example, by means of its lower end resting against a piece positioned for this purpose below the level of the floor, facing the opening 11;

the visual indicator 5 could be separate from the control lever and the pusher 4, and be only activated by the bolt 3, the pusher 4 then being brought back to rest position by independent return means.

We claim:

1. A movable seat for a vehicle, of the type which can be easily joined to or separated from a floor of said vehicle, including at least one unlockable fixing mechanism which can be brought, along a given direction of insertion, to cooperate with retaining means of said floor for rigidly joining the seat to the floor wherein said fixing mechanism comprises a locking member sliding transversely with respect to said direction of insertion;

an end of the locking member intended to cooperate with the retaining means having an upper surface inclined with respect to the sliding direction;

an elastic return means for bringing the locking member back to a locked position; and control means for shifting the locking member, in opposition to said elastic return means, towards an unlocked position, said control means cooperating with driving means of said locking member;

wherein said control means includes a lever hinged on the seat, whose first end cooperates with said driving means and whose other end includes a pusher.

2. A seat according to claim 1, wherein the first end of the lever is shaped like a fork with two branches, said driving means having flanks of transversal grooves provided on the side of the locking member and said branches fitting into both sides of the locking member, inside said transversal grooves.

3. A seat according to claim 2, wherein the end of the fork cooperates, in locked position, with an abutment surface of the mechanism, so as to limit the displacement of the locking member in the direction in which it exits.

4. A seat according to claim 1, further comprising a visual indicator, apparent when the locking member is not in locked position.

5. A seat according to claim 1, wherein the lever is returned to its rest position, corresponding to the locked position, by the locking member, and further wherein the lever carries a visual indicator emerging from the foot of the seat when the locking member is not in a locked position.

* * * * *